United States Patent [19]

Molloy et al.

[11] 4,182,020

[45] Jan. 8, 1980

[54] METHOD OF MANUFACTURING A BATTERY COVER FOR PLACEMENT IN AN OPENING IN A BATTERY CONTAINER

[75] Inventors: Len Molloy, San Ramon; Mark R. Schneider, San Jose, both of Calif.

[73] Assignee: Fairchild Camera and Instrument Corporation, Mountain View, Calif.

[21] Appl. No.: 896,836

[22] Filed: Apr. 17, 1978

Related U.S. Application Data

[62] Division of Ser. No. 754,212, Jan. 3, 1977, abandoned.

[51] Int. Cl.² ..................... B23P 19/00; B32B 31/00
[52] U.S. Cl. ..................... 29/469.5; 29/177; 29/450; 29/453; 58/23 BA; 83/19; 83/176; 113/121 A; 156/250; 220/307
[58] Field of Search .............. 29/469.5, 450, 453, 29/177; 83/176, 19, 20, 21; 113/121 R, 121 A; 156/250, 261; 220/307; 58/23 BA

[56] References Cited

U.S. PATENT DOCUMENTS

| | | | |
|---|---|---|---|
| 1,282,612 | 10/1918 | Massey | 156/250 X |
| 2,306,587 | 12/1942 | Broderson | 156/250 X |
| 2,375,518 | 5/1945 | Bolle | 83/19 |
| 3,028,667 | 4/1962 | Wintermute et al. | 29/469.5 |
| 3,072,519 | 1/1963 | Salzman | 156/250 X |
| 3,105,621 | 10/1963 | Francis | 220/307 X |
| 3,397,661 | 8/1968 | Allman et al. | 113/121 A |
| 3,405,437 | 10/1968 | Murray | 83/19 X |
| 3,595,111 | 7/1971 | Hershberger | 83/19 |
| 3,672,154 | 6/1972 | Huber | 53/23 BA |
| 3,713,944 | 1/1973 | Dennis et al. | 156/261 |

FOREIGN PATENT DOCUMENTS 632522 12/1961 Canada .................... 156/261

*Primary Examiner*—Charlie T. Moon
*Attorney, Agent, or Firm*—Alan H. MacPherson

[57] ABSTRACT

A watch case containing at least one opening, in combination with means for sealing said opening comprising a plate of circular material containing on one surface thereof a resilient disc shaped material with an edge having a concave outward shape. In a preferred embodiment the plate compresses a stainless disc and the resilient material comprises neoprene rubber.

3 Claims, 5 Drawing Figures

METHOD OF MANUFACTURING A BATTERY COVER FOR PLACEMENT IN AN OPENING IN A BATTERY CONTAINER

This is a division of application Ser. No. 754,212 filed Jan. 3, 1977, now abandoned.

BACKGROUND OF THE INVENTION

1. Field of the Invention

This invention relates to electronic watches and in particular to electronic watches containing at least one snap-in cover for sealing at least one opening through which a battery or batteries can be placed in or removed from the electronic watch.

2. Prior Art

Electronic watches are well known in the art. Such watches are typically driven by two silver oxide 1.5 volt batteries (commonly known as "button cells") developed for use in watches. One problem with such batteries has been their replacement. To replace the batteries, the back of the watch must be removed, the batteries either unscrewed or otherwise released, removed from the module and replaced with new batteries. Many individuals have neither the tools nor the desire to do this and thus professional help is often required. Furthermore, the replacement of the back of the case onto the remainder of the case is difficult to do in many instances.

One proposed solution to this problem involves the formation of the hole in the back of the watch case, threading the hole and then forming a disc shaped cap with threads on the edges to match the threads on the hole for screwing into the hole to close the back of the case. This approach is satisfactory from the point of view of allowing the user easy access to the batteries in the watch but is unsatisfactory from the point of view of the manufacturer in view of the added expense associated with the formation of the threaded hole and screw-in plate.

SUMMARY OF THE INVENTION

This invention overcomes the disadvantages of the prior art watches by providing a watch case with a snap-in cover for closing the cavity in the watch in which a battery is placed. The snap-in cover comprises a substantially circular disc of metal on one surface of which has been mounted a resilient material of slightly larger diameter than the opening through which the battery is passed. The edge of the resilient material is preferably concave with the minimum diameter of a cross-section through the resilient material being slightly larger than the maximum diameter of the hole. The cover is thus designed to be snapped into the opening with the resilient material expanding to press firmly against the edges of the opening and thus hold the cover properly in place.

In one embodiment, the resilient material serves not only to hold the cover in the opening but also to press the battery firmly in its seat, thereby insuring continous electrical contact between the battery and the components of the watch.

DETAILED DESCRIPTION

Figure 1:
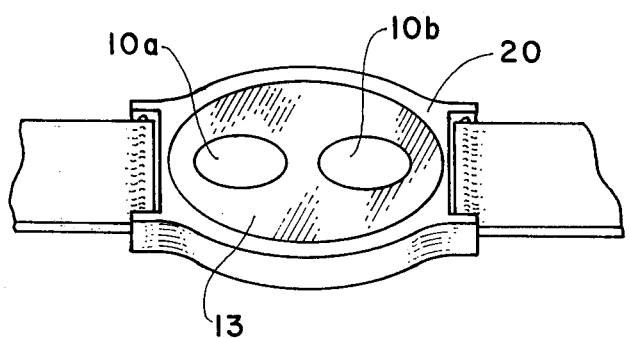
FIG. 1 shows the back of a typical watch case containing two snap-in covers of this invention.

As shown in FIG. 1, a watch case 20 contains a back portion 13 in which are formed two openings through which batteries can be inserted or removed from the watch. While this invention is described in conjunction with a watch case containing two openings, this invention may be used with watch cases containing any desired number of openings for placement of batteries. Shown in place in the openings are covers 10a and 10b of this invention.

Figure 2A:
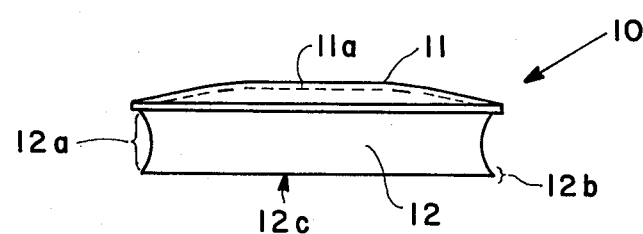
FIG. 2a shows a cross-sectional view of the snap-in cover of this invention.

FIG. 2a shows in cross-sectional view one cover 10 of this invention. Cover 10 comprises a circular plate 11 of a hard material such as stainless steel to one surface of which has been attached a resilient material 12. Material 12 has been typically formed of a neoprene rubber of the proper resiliency to firmly hold cover 10 in an opening in the back of the watch case. In one embodiment, a neoprene rubber of 50 to 60 durometer has been found to be satisfactory. The rubber is bonded to one face of the cover 11 by a suitable epoxy. In one embodiment, the epoxy was 3M 1357 adhesive.

Plate 11 can be of any hard material suitable for use in a watch case. In one embodiment plate 11 was formed of stainless steel. While the stainless steel is shown to be concave on the face which is turned toward the watch, this plate can have other shapes as desired.

Figure 2B:
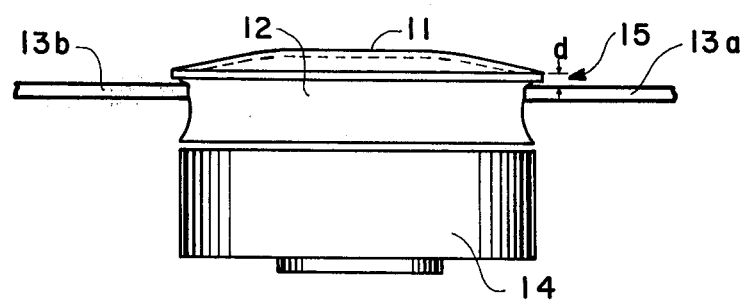
FIG. 2b shows a cross-sectional view of the snap-in cover of this invention located in position in the watch case above a battery.

FIG. 2b shows in cross-section the cover 10 placed in an opening in the back 13 of the watch case shown in FIG. 1. Plate 11 is slightly above the surface of back 13 by the distance "d" so that fingernails can be placed under the edge 15 of cover 11 to lift the cover from the opening.

As shown in FIG. 2a, the edge 12a of the opening is concave in the direction facing the edge of the opening. Thus the portion 12d of the resilient material 12 deforms as the cover 10 is pushed through the opening but then snaps back to its former position to assist in conjunction with the concave nature of the edge, to hold the cover in position in the opening. The lower surface 12c of the resilient material then abuts directly against the top surface of battery 14 to hold the battery 14 in its proper position.

The above cover significantly increases the advantages of a digital watch by making it possible for owners to easily and inexpensively replace their batteries. Suprisingly, despite the low cost of the cover of this invention, a watch case containing this cover has been found to be moisture and water resistant. Thus the watch containing this cover has been placed in a container of water and the cover has prevented water from interfering with the operation of the watch. The cover is easily removed by inserting fingernails under the edges 15 of the cover between the under portion of the cover 11 and the back 13 of the watch. Batteries can then be removed from the watch or pushed into the watch through the hole and the cover can then be snapped back into the opening to seal the battery in the watch. The natural flex of the resilient material 12 retains the cover in position.

Figure 3A:
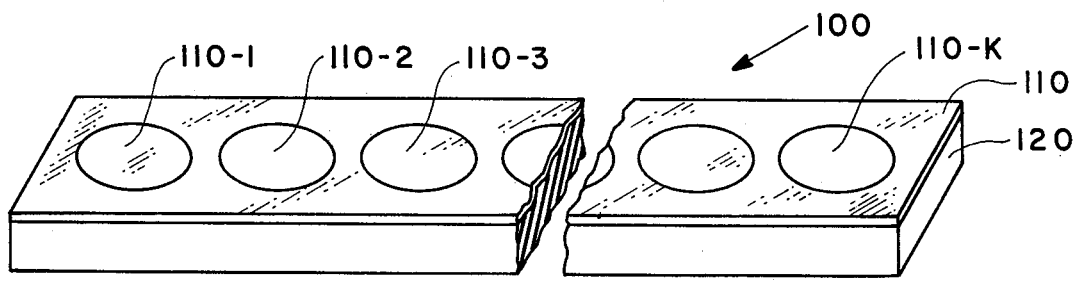
FIG. 3a shows a strip of material from which the hatchback covers are formed.
Figure 3B:
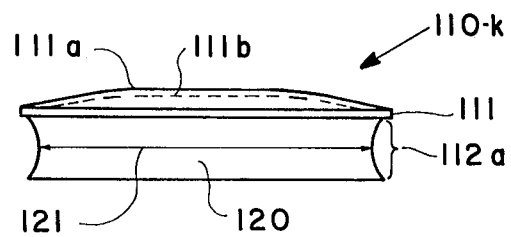
FIG. 3b shows in cross-sectional view of hatchback cover of this invention.

FIG. 3 shows a strip of material from which the snap-in watch covers of this invention are fabricated in one embodiment. The strip 100 comprises a lamination of metal 110 with resilient material 120. In one embodiment, material 110 is 300 series stainless steel and resilient material 120 is neoprene rubber of 50 durometer. The material 120 is joined to steel 110 by adhesive number 1357 manufactured by 3M Corporation. Of course, any equivalent bonding material is satisfactory for use in this invention. Shown in circles on the top of material 110 are the outlines of the snap-in covers to be stamped from the strip 110. Shown in the side view in FIG. 3b is a typical cover stamped from the strip shown in FIG. 3a. Cover 110-k is formed from strip 100 in a well known manner by stamping. However, the stamping process yields a cover with certain characteristics particularly well suited to the application of the cover as a closing means for sealing the battery opening in the back of a watch. In particular, during the stamping process, resilient material 120 on the bottom of strip 110 (FIG. 3a) is compressed thereby expanding the lateral dimensions of the compressed material. Consequently, when the die stamp cuts the compressed material and the compressed material 120 returns to its normal thickness, a natural concavity is formed in the edge 112a (FIG. 3b) of resilient material 120. By properly selecting the diameter of the circle 110-1, 110-2 . . . 110-K (where K is an integer representing the maximum number of covers to be stamped from a given strip), the minimum diameter 121 of the circumferential edge 112a of material 120 is selected to be slightly larger than the maximum diameter of the opening in the watch casing in which the cover is to be placed. 112a of material 120 is selected to be slightly larger than the maximum diameter of the opening in the watch casing in which the cover is to be placed.

Furthermore, the stamping operation curves the top surface 11a of cover plate 111 such that the bottom surface 11b of plate 111 is concaved downward as shown by the dashing line 111b in FIG. 3b. This curvature lends an aesthetically pleasing appearance to the cover, reduces the likelihood of the cover burring or catching on arm hairs of the user, but slightly reduces the diameter of the cover which would be obtained if the cover was not elonged. Accordingly, the deformation is taken into consideration in designing the proper circle to be cut by the stamping tool.

Of course, the cover can assume any shape required to allow batteries to be placed within or removed from the watch. While this snap-in cover has been described in conjunction with a watch and indeed its primary use is with a watch, the cover can also be used with other battery-powered mechanisms similar to those of watches, where a low-cost, reliable, water-resistant seal is required. Such applications might include battery-operated hearing aids, small portable radios, and cameras.

We claim:

1. The method of manufacturing a battery cover suitable for placement in an opening in a battery container through which a battery can be inserted or withdrawn from said container, to maintain a battery in position and to prevent unwanted materials from entering said battery container, said cover comprising a metal plate having a shape conforming to the profile of the battery, and a resilient disc of material adherent to said metal plate, the outer edge of said resilient material being adapted to be in pressing contact with the internal edge of the opening in the battery container, thereby to firmly anchor said cover in said opening, to provide a water-resistant seal with said opening, and to firmly engage an enclosed battery, said cover being adapted to fit in said opening in such a manner that said metal plate rests above the exposed surface of said battery container by an amount sufficient to allow fingernails to be inserted between said metal plate and said exposed surface for removing said cover from said opening, comprising the steps of:

forming a metal strip;

joining a resilient material to said metal strip by means of an adhesive; and stamping said cover from said strip, thereby to provide a cover comprising said metal plate and said resilient material adherent to said plate, wherein, during said stamping process, said resilient material is compressed, thereby expanding lateral dimensions of the compressed material such that when the stamp cuts the compresed resilient material and said resilient material returns to its normal thickness, a natural concavity is formed in the edge of said resilient material.

2. The method of claim 1 wherein said process of stamping is such that the minimum diameter of the circumferential edge of resilient material is slightly larger than the maximum diameter of the opening in which the battery cover is to be placed.

3. The method of claim 2 wherein the stamping operation curves the top surface of the metal plate such that the surface of the plate facing the battery is concave downward, thereby to reduce the likelihood of burrs formed on the cover from interfering with its use.

* * * * *